United States Patent [19]
Fowler

[11] 3,793,879
[45] Feb. 26, 1974

[54] TESTING AND INCREASING BREAKDOWN VOLTAGE OF CROSSOVERS

[75] Inventor: William H. Fowler, Bethlehem, Pa.

[73] Assignee: Western Electric Company Incorporated, New York, N.Y.

[22] Filed: June 19, 1972

[21] Appl. No.: 264,127

[52] U.S. Cl. .................. 73/95
[51] Int. Cl. .................. G01n 3/08
[58] Field of Search .... 29/593, 574, 628; 73/96, 95, 73/150 R, 150 A

[56] References Cited

UNITED STATES PATENTS

| | | | |
|---|---|---|---|
| 3,572,108 | 3/1971 | McShane et al. | 73/95 X |
| 3,461,524 | 8/1969 | Lepselter | 29/25.42 |
| 2,831,346 | 4/1958 | Brescka et al. | 73/150 |
| 2,825,225 | 3/1958 | Connell et al. | 73/159 |

*Primary Examiner*—Roy Lake
*Assistant Examiner*—James W. Davie
*Attorney, Agent, or Firm*—W. O. Schellin

[57] ABSTRACT

Crossover conductors on thin film circuits are tested for mechanical weakness, and the voltage breakdown strength between the crossover conductors and underlying crossunder conductors is improved by using a resilient cylindrical surface to bring a tape coated with a pressure sensitive adhesive into rolling contact with the circuits. As the adhesively coated tape separates from the circuits, an adhesive force breaks mechanically weak crossover conductors from the circuits. The voltage breakdown strength of mechanically strong crossover conductors is improved by an increased separation between the crossover and the crossunder conductors.

11 Claims, 6 Drawing Figures

TESTING AND INCREASING BREAKDOWN VOLTAGE OF CROSSOVERS

BACKGROUND OF THE INVENTION

1. Field of the Invention

This invention relates to methods of making electrical film circuits having crossover conductors thereon, and more particularly to methods of testing these crossover conductors for mechanical weakness and of increasing the voltage breakdown strength between the crossover conductors and the corresponding crossunder conductors on these circuits.

2. Description of the Prior Art

Film circuits are generally produced on a dielectric substrate by a series of steps, including selective masking, plating and etching. Frequently, a generated conductor pattern includes passive elements such as resistors or capacitors. In hybrid integrated circuits a number of active elements is then connected to the already existing conductor pattern and the passive elements.

The problem of routing individual conductors on such hybrid circuit is quite complex. Frequently, it is desirable or even necessary for one conductor of such circuit to cross the path of another conductor. Furthermore, the crossing conductor has to remain electrically insulated from the conductor it crosses. The crossing conductor is commonly called a crossover or a crossover conductor. The underlying conductor is called a crossunder conductor. A crossover conductor in combination with a crossunder conductor is commonly referred to as a crossover circuit.

Crossover conductors are normally generated by a series of masking and plating steps in addition to the steps required for generating the basic circuit in direct contact with the substrate. The following method is commonly employed to produce such crossover conductors.

First, the basic circuit is covered with a plated-on layer of copper. The thickness of the copper layer determines the spacing between the crossover conductor and the crossunder conductor. After plating the copper layer over the base pattern, apertures are etched into this copper layer at points where pedestals or pillars are to be located for terminating the crossover conductors.

The pillars and crossovers are then plated onto the circuit. After plating of the crossover conductors, the supporting copper layer is etched away, leaving the crossover conductors isolated from the underlying crossunder conductors. A particular method for making crossover circuits is described in U. S. Pat. No. 3,461,524 granted to M. P. Lepselter.

Faulty crossover circuits may be generated by misaligned masks during the above-described process. Such misalignment results in a mechanically weak connection between the crossover conductor and the pillar. The mechanical weakness of such a connection usually passes an electrical continuity test. It is only after the circuit goes into use and is subjected to normal temperature cycling that the crossover conductor connection breaks to render the circuit defective. Visually checking for such weak connections is time consuming and does not always reveal all mechanically weak conductors.

A crossover circuit is also unacceptable if it fails to pass a voltage breakdown test that is administered by applying a potential difference between the crossover conductor and the underlying crossunder conductor. In any given film circuit having crossovers, the nominal spacing between the crossover conductor and the crossunder conductor is such that each crossover circuit portion passes the standard voltage breakdown test. However, in some instances, faulty plating may result in surface irregularities or in a change in the nominal spacing between the crossover conductor and the crossunder conductor to ultimately result in a failure of the voltage breakdown test applied to the crossover circuit.

Despite a low percentage rate of crossover circuits failing such voltage breakdown test, the production yield of acceptable film circuits from any sampled production lot is nevertheless seriously affected because of the large number of crossover circuits included in each film circuit. A single failure on any film circuit renders the film circuit as a whole defective. Each one of the crossover circuits on each film circuit has to pass the voltage breakdown test before the entire film circuit becomes acceptable.

The quality of film circuits can, therefore, generally be improved if weak crossover connections can be singled out in the early production stages of the circuits. Furthermore, the yield in any given lot of film circuits can be increased by reducing the number of crossover circuit portions which fail the standard voltage breakdown test.

SUMMARY OF THE INVENTION

It is, therefore, an object of this invention to provide new methods of increasing voltage breakdown characteristics between corresponding crossover and crossunder conductors.

Another object of this invention is to provide a method of testing for mechanically weak crossover conductors on film circuits and of increasing the voltage breakdown strength between crossover conductors passing such tests and the corresponding underlying crossunder conductors.

A further object of this invention is to provide methods of mechanically strengthening unsupported lengths of crossover conductors and of increasing the voltage breakdown strength of such crossover conductors with respect to the corresponding crossunder conductors.

With these and other objects in view, a new method of increasing voltage breakdown characteristics between corresponding crossover and crossunder conductors includes attaching a movable member to the crossover conductors, and raising the member with respect to the underlying crossunder conductor to lift the crossover conductor away from the corresponding crossunder conductor to increase the gap width between such corresponding crossover and crossunder conductors.

BRIEF DESCRIPTION OF THE DRAWINGS

Other objects and advantages of the present invention may be more clearly understood by reference to the following detailed description and accompanying drawings, wherein.

DETAILED DESCRIPTION

The Crossover Circuit

Figure 1:
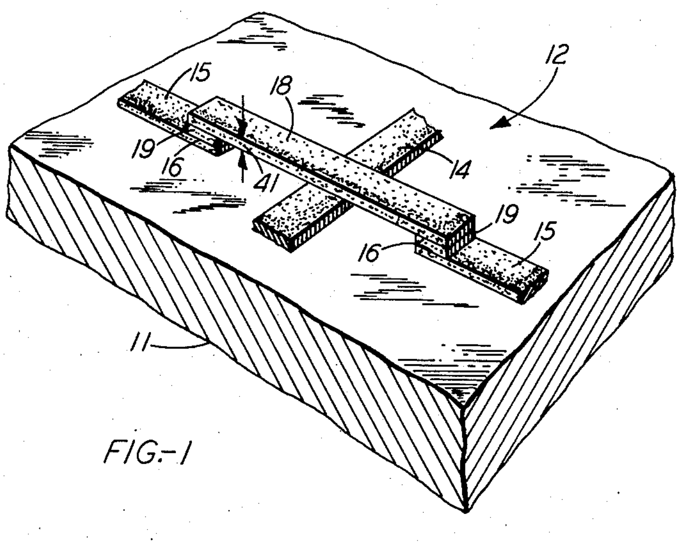
FIG. 1 is a greatly enlarged perspective view of a portion of a film circuit showing a crossover and a crossunder conductor.

Referring now to FIG. 1, a substrate 11 is shown on a greatly enlarged scale supporting a crossover circuit designated generally by numeral 12. A crossunder conductor 14 of the circuit 12 lies in direct contact with the substrate 11. The crossunder conductor 14 is shown extending in a direction normal to the crossover conductor 12.

A second conductor 15 lies also in direct contact with the substrate 11. The conductor 15 occupies the same plane as the crossunder conductor 14 and extends perpendicular thereto. To avoid contact between the crossunder conductor 14 and the second conductor 15, the second conductor 15 terminates on either side of and spaced from the crossunder conductor 14.

To provide electrical continuity between terminating portions 16 of the conductor 15, a crossover conductor 18 bridges the space between the terminating portions 16. A pedestal or pillar 19 on each of the terminating portions 16 spaces the crossover conductor 18 from the crossunder conductor 14 to provide a gap width 20 between the crossunder conductor 14 and the crossover conductor 18.

The gap width 20 between the crossunder conductor 14 and the crossover conductor 18 is an important factor in determining the maximum voltage differential that can exist between the conductors 14 and 18 before electrical breakdown occurs. While it is possible to design and manufacture crossover circuits such as the circuit 12 having gap widths 20 within close tolerances to a predetermined value, large scale manufacturing techniques cause, at times, excessive deviations from such predetermined value.

Figure 2:
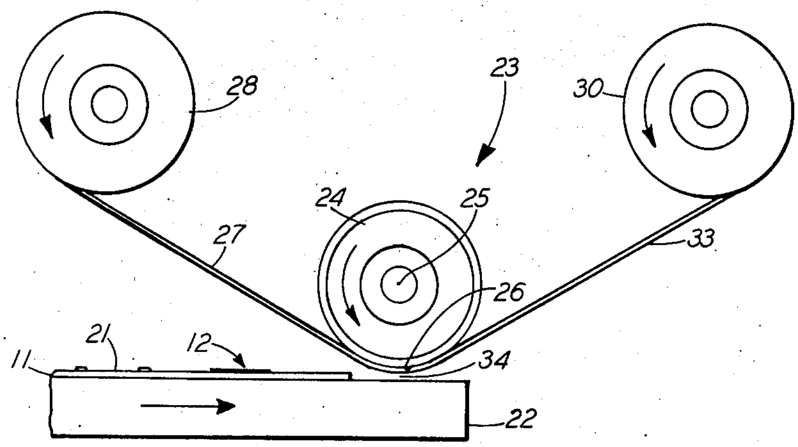
FIG. 2 is a side elevational view of a film circuit showing a cylindrical member contacting portions of the circuit according to the invention.

Testing for Mechanically Weak Crossover Conductors and Increasing the Voltage Breakdown Strength of Crossover Circuits Referring now to FIG. 2, an arrangement for increasing the voltage breakdown characteristics of the crossover circuit 12 is shown in schematic form. A plurality of the crossover circuits 12 on the substrate 11 along with various other circuit elements formed on the same substrate 11 comprises a film circuit 21. The crossover circuits 12 of this film circuit 21 are processed in accordance with the present invention.

To increase the voltage breakdown level of the crossover circuits 12 and to test such circuits 12 for mechanically weak crossover conductors 14, an operator or an automatic dispensing facility places the film circuit 21 onto a base 22. The base 22 is then moved with respect to and toward a contact roller assembly, designated generally by numeral 23. The assembly 23 includes a contact roller 24 which is rotatable about an axis 25 parallel to the base 22 and perpendicular to its movement. The roller 24 has a resilient outer surface 26 to provide a back-up surface for a movable member, such as a web or tape 27.

The tape 27 extends from a supply reel 28 across the surface 26 to a take-up reel 30 of the assembly 23. A pressure sensitive adhesive coating 33 on the tape 27 faces toward the base 22.

Normally, a space 34 exists between the tape 27 and the base 22. However, as the base 22 is moved, the circuit 21 enters into the space 34. The roller 24 backing the tape 27 urges the adhesive coating 33 into contact with the upper portion of the circuit 21 located in the space 34. The adhesive coating 33 attaches the tape 27 to the portion of the circuit 21 in contact with the coating 33.

As the base 22 is moved further and the circuit 21 continues to move through the space 34 the contact between the coating 33 and portions of the circuit 21 shifts across the circuit.

It is possible to practice the present invention by using the cylindrical surface 26 of the roller 24 coated directly with an adhesive coating such as the coating 33 instead of using the tape 27 and passing it over the surface 26. However, when it is desirable to subject a great number of the circuits 21 to the presently disclosed method, a constant re-use of the adhesive, limited in length by the circumference of the roller 24 tends to degrade the adhesive characteristics of the coating 33.

Dispensing a new length of the tape 27 from the supply reel 28 for each film circuit passing through the space 32 eliminates problems caused by re-using the adhesive coating 33 on subsequent circuits. Such problems include a significant reduction in the adhesive strength of the coating 33 because dust particles collect on such coating 33 as the coating is urged into contact with one of the film circuits 21.

Figure 3:
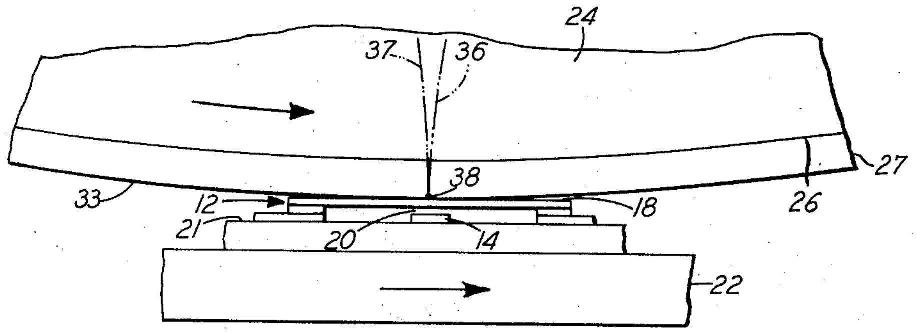
FIG. 3 is a greatly enlarged portion of the circuit shown in FIG. 2 at the point where the cylindrical member contacts a crossover circuit.
Figure 4:
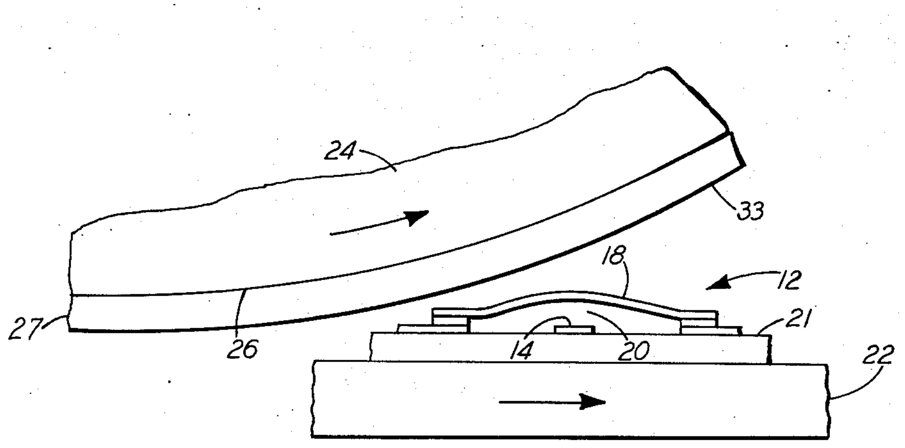
FIG. 4 is a cross sectional view of the same circuit portion as shown in FIG. 3 after the cylindrical member has separated from the circuit.

As the contact between the tape 27 and portions of the circuit 21 shifts across such circuit 21, the relative motion of the tape 27 with respect to the circuit 21 follows a cycloidal path into and out of contact with individual ones of the crossover conductors 18. The cycloidal path of the tape 27 relative to the circuit 21 is shown as a path along lines 36 and 37 (FIG. 3) of a reference point 38 on the tape 27.

Significantly, the cycloidal path of the tape 27 in close proximity of the film circuit 21 is substantially perpendicular to the circuit 21. Consequently, any force exerted by the tape 27 on the circuit 21 or, in particular, on the crossover conductors 18, and any resulting movement of such conductors 18 are also substantially perpendicular to the circuit 21.

In following the cycloidal path, the tape 27 contacts the crossover circuit 12. Upon contact with the circuit 12, the adhesive coating 33 attaches the tape 27 to the crossover conductor 18 of such circuit 12. As the tape 27 continues to follow the cycloidal path along line 37, the adhesive strength of the coating 33 on the tape 27 applies a force to the crossover conductor 18. This force lifts the crossover conductor 18 away from the crossunder conductor 14 before the tape 27 separates from the crossover conductor 18. Lifting the crossover conductor 18 with respect to the crossunder conductor 14 increases the gap width 20 and, also, the voltage breakdown strength between the conductors 14 and 18. In the extreme case where initially the crossover conductor 18 is in contact with the crossunder conductor 14, lifting the crossover conductor 18 forms a gap width 20 between the conductors 14 and 18 to provide electrical separation therebetween.

The method of increasing the voltage breakdown strength of the crossover circuits 12 is advantageously applied to film circuits 21 to repair such circuits 21 which have already failed a voltage breakdown test of some of the crossover circuits 12 on such film circuits 21. With the gap widths 20 between the crossunder conductors 14 and the crossover conductors 18 increased the crossover circuits 12 pass a subsequent voltage breakdown test.

The gap width 20 between crossunder conductors 14 and crossover conductors 18 can also be advantageously increased before the conductors 14 and 18 are subjected to a voltage breakdown test. Increasing the gap width 20 between the conductors 14 and 18 at an early stage in the production cycle of film circuits 21:

a. improves those crossover circuits 12 which would have failed a voltage breakdown test to pass a subsequent voltage breakdown test in substantially all instances;

b. further improves the voltage breakdown strength of initially acceptable crossover circuits 12; and c. subjects all crossover circuits 12 to the test for weak crossover conductors 18 at such early stage in the production cycle.

As each of the crossover conductors 18 is lifted away from its respective crossunder conductor 14, the force lifting such crossover conductors 18 is opposed by a reactive tensile force along the longitudinal axis of each of such conductors 18. This tensile force tests for the mechanical strength of each of the crossover conductors 18.

Crossover conductors 18 having mechanically weak sections fail the test by breaking in proximity of such weak sections as a result of the tensile force applied to the conductors 18. The break opens an electrical path through the conductors 18 to permit the conductors 18 which failed the test to be identified by an electrical continuity test.

Figure 5:
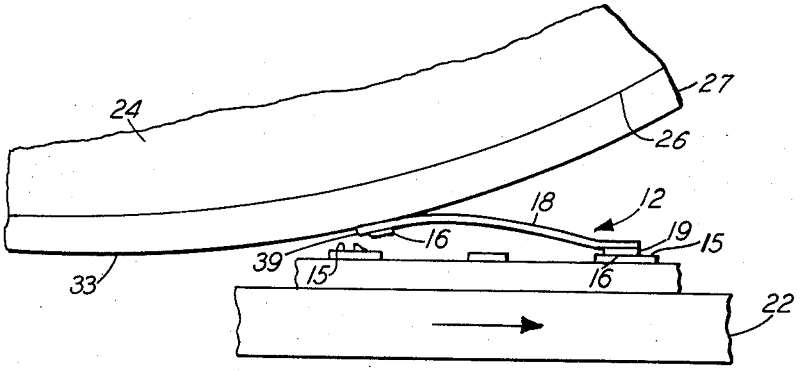
FIG. 5 is a side view of a portion of the same circuit showing a weak crossover connection being separated by an adhesive member according to the invention.

Also, open ends, such as the end 39 in FIG. 5, are raised up from the circuit 21 by the tape 27 before the tape 27 separates from the conductors 18. A visual inspection of the circuit 21 readily discloses such raised up, open ends 39 of crossover conductors 18 having failed the test for mechanical strength.

The vast number of failures of crossover conductors 18 results from defects which can be traced to a misalignment of masks during the various steps of making the crossover circuits 12. Misaligned masks laterally displace either the conductors 18 or the pillars 19 from squarely aligned positions as shown in FIG. 1. The displacement reduces the contact areas between the conductors 18 and the pillars 19 or the contact areas between the pillars 19 and the second conductors 15.

Other failures occur because of the presence of dust particles on the film circuit 21 during the photographic pattern development of the crossover circuit 12. Such dust particles mask out and prevent the exposure to light of a photoresist commonly used to generate crossover circuits. Narrow and weak sections in the crossover conductors 18 result.

Plating defects account for another type of failure of the test for mechanical strength. Plating defects appear, for example, as insufficient metal deposits in the formation of the pillar 19. Because of such insufficient metal deposits, the pillars 19 are mechanically weak and break loose from the circuit 21 as a result of the test for mechanical strength.

Without being subjected to the test for mechanical strength, weak crossover conductors may fail due to mechanical stresses when the circuit 21 is already in service. Furthermore, weak crossover conductors 18, because of the reduced cross sectional area of such conductors 18 offer an increased electrical resistance to a current flow through the conductors 18. Because of resistive heating and resulting thermal deterioration of such conductors 18, the increased resistance is potentially troublesome when such circuit 21 is in service. The test for mechanical strength identifies such potentially troublesome conductors 18.

The weak crossover conductors 18, once-identified, can be repaired, as it is commonly done in many applications. At times, however, particularly when a large number of crossover conductors on a circuit 21 have been identified as being weak it is advantageous to scrap the circuit 21. It is, therefore, a good practice to subject the circuits 21 to the described method of increasing the voltage breakdown strength of crossover circuits 21 and of testing for weak crossover conductors early in the production process of such circuits 21. Acceptable circuits 21 may then be further processed by filling the gap width 20 with a dielectric material to preserve the existing voltage breakdown strength between the conductors 14 and 18.

The steps of attaching a movable member, such as the tape 27, to the crossover conductors 18, and then raising the member with respect to the underlying crossunder conductors 14 to lift each of the crossover conductors 18 away from each of the corresponding crossunder conductors 14, has been described in reference to the assembly 23. It should be understood, however, that any reference to the assembly 23 is not used as a limitation, but merely as an illustration of the preferred method according to this invention.

The Tape in Relation to the Circuits

While other means may suffice, an adhesive tape, such as the tape 27 functions particularly well as a movable member to become attached to the crossover conductors 18. The adhesive qualities of the coating 33 of the tape 27 is a major factor in determining the magnitude of the tensile force that the tape exerts on the crossover conductors 18 after becoming attached to the conductors 18 and upon being raised away from such conductors.

A commonly used method of determining the adhesive strength of tapes, such as the tape 27, is to bring a length of such tape 27 into contact with a flat, smoothly ground plate (not shown). The tape 27 is then peeled back on itself and the force required to peel back the tape 27 is measured. The measured value, specified in grams, is divided by the width specified in inches, of the tape, to obtain a standard value of the adhesive strength of such tape.

Three tapes, distinguished from ach other by different values of their adhesive strength, have been used with the method according to the present invention. The three tapes were tested in accordance with the above-described, common method for testing tapes. The tapes had an adhesive strength of 440, 460 and 946 grams per inch of width, respectively.

The three tapes were used to process, according to the present invention, thin film circuits 21 as they are presently used in electronic applications in the communications industry. On these thin film circuits 21 crossover conductors 18 had a thickness of approximately one mil (0.001 inch). The lengths of these conductors 18 ranged from substantially fifty to seventy mils (0.050 to 0.070 inch).

Each tape, in becoming attached to and being raised from the circuits 21, lifted the crossover conductors 18 away from the crossunder conductors 14 to increase the voltage breakdown strength between the two conductors. In general, the amount by which a tape 27 with a certain adhesive force lifts the conductors 18 varies substantially in proportion to a ratio of the third power of a thickness 41 of the conductor 18 to the third power of an unsupported length of the conductor 18 between the conductors 15.

The maximum adhesive strength of the tape 27 that can be used in processing circuits 21 is determined by the maximum tensile force which acceptable conductors can withstand. An important factor in determining this force is the thickness of the conductor 18. The three tapes used to process the above thin film circuits 21 were within the range of permissible adhesive forces for such circuits 21.

The adhesive strength will also affect the quality of the conductors 18 that pass the test for mechanical strength. An increase in adhesive strength of the tape 27 will increase the number of conductors 18 that fail such test.

In testing the above-described circuits 21 the tape having an adhesive strength of 460 grams per inch of width satisfactorily identified mechanically weak conductors 18 and provided a margin of safety for the protection of acceptable conductors 18.

The Roller Pressure

It has further been found that a pressure which is applied to force the tape 27 into contact with the circuit 21 affects the tensile force exerted by the tape 27 on the conductors 18 when such tape 27 is raised. It is, therefore, advantageous to have a provision for adjusting the space 34 between the assembly 23 and the base 22 since the width of the space 34 affects this pressure.

An adjustment takes the thickness of the circuit 21 into consideration. It has been found that the tensile force of the adhesive tape 27 acts most uniformly on conductors 18 when the space 34 is adjusted to move the tape into contact with the film circuit 21 at a pressure of 20 pounds per square inch (20 psi).

To smooth out or equalize variations in the contact pressure between the tape 27 and the circuit 21, the cylindrical backup surface 26 is preferably of a resilient material. The resiliency of the surface 26 equalizes variations in pressure which would normally result from surface irregularities on the roller 24 and from surface irregularities on the film circuit 21.

Other Considerations

Figure 6:
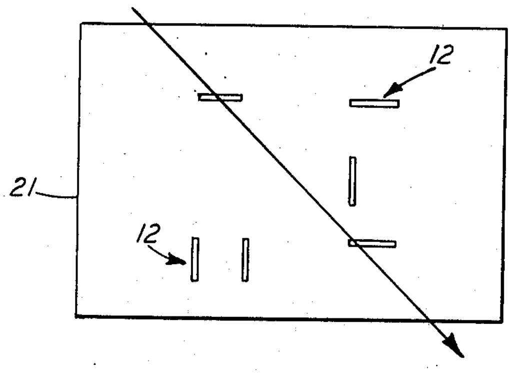
FIG. 6 is a top view of a film circuit having crossover circuits arranged in two directions perpendicular to each other.

Referring now to FIG. 6, there is shown a top view of a typical film circuit 21 having crossover circuits 12 which extend in two directions, mutually perpendicular to each other, or at right angles to each other. It has been experienced that the increase of the gap width 20 between the respective conductors 14 and 18 of the crossover circuits 12 is greater on a statistical average when the length of the crossover conductor 18 between the terminating portions 16 extends parallel to the axis of the roller 24 than when the length extends perpendicular thereto.

To improve the uniformity of increase in the gap width 20 among crossover circuits 12 extending at right angles to each other, it is preferred to move such circuits 21 through the space 34 (see FIG. 2) in a direction substantially bisecting the angle between the crossover conductors 18 on such circuit 21. One of such preferred directions is indicated in FIG. 6 by an arrow extending across the circuit 21.

By increasing the gap width 20 between the conductors 14 and 18, the crossover conductors 18, initially substantially straight and parallel to the circuit 21, are formed arcuately away from the underlying crossunder conductors.

Such arcuate form increases the mechanical strength of the ultimate crossover conductors 18 over the strength of the initial, straight conductors 18. Once arcuately formed, the crossover conductors 18 are less likely to be forced downward than the straight crossover conductors 18.

Even though the method of increasing the voltage breakdown strength between the crossover conductors 18 and the crossunder conductor 14 and of testing the crossover conductors mechanically has been described in reference to a specific apparatus, modifications of the disclosed method are possible without departing from the scope or spirit of this invention.

What is claimed is:

1. In making a circuit, wherein crossover conductors bridge underlying crossunder conductors, a method of increasing voltage breakdown characteristics between corresponding crossover and crossunder conductors, which comprises:

moving successive portions of an adhesively coated member into rolling contact with the circuit to attach the portions to the crossover conductors; and raising the attached portions of the member with respect to the corresponding crossunder conductors to lift the crossover conductors away from the crossunder conductors.

2. A method according to claim 1, which further comprises:

detaching the portions of the member from the crossover conductors in response to a determinable tensile force between each of the conductors and the portions of the member.

3. A method of repairing a film circuit having bridging crossover conductors and corresponding underlying crossunder conductors, the circuit having a gap width below that of a minimum standard between at least one of the crossover conductors and at least one corresponding crossunder conductor, the method comprising:

moving an adhesively coated member into contact with portions of the circuit including the crossover conductor, the adhesive coating on the member attaching the member to such crossover conductor upon contact therewith; and moving the member out of contact with the circuit, the attached coating exerting a pulling force on the crossover conductor to lift the crossover conductor away from the corresponding crossunder conductor and to increase the gap width between the conductors.

4. In manufacturing film circuits including crossover conductors for bridging crossunder conductors, wherein gaps between the crossover and crossunder conductors are capable of having potential differences, the method of increasing the capability of the crossover and the crossunder conductors to have potential differences and mechanically testing the crossover conductors, which comprises:

attaching a movable member to a top surface of each of the crossover conductors;

moving the member with the crossover conductors attached away from the circuit to simultaneously increase the gap width between the crossover and the crossunder conductors and test whether the mechanical strength of the crossover conductors has a certain value; and detaching the member from the top surfaces of the crossover conductors after the gap width between the conductors has increased and the mechanical strength of the crossover conductors has been tested.

5. In making a film circuit, a method of increasing the voltage breakdown strength between crossover conductors and crossunder conductors on such circuit and testing th circuit for mechanically weak crossover conductors, which comprises:

attaching a movable member to a top surface of each of the crossover conductors on the circuit; moving the member and the attached crossover conductors to lift the crossover conductors away from the crossunder conductors, to thereby increase the voltage breakdown strength between such conductors; and separating from the circuit crossover conductors having mechanically weak pedestal connections, unable to withstand a predetermined force exerted by the attached member, to identify such conductors as mechanically weak crossover conductors.

6. A method according to claim 5:

wherein the movable member is an adhesively coated cylindrically-shaped surface which is attached to the top surface of the crossover conductors by rolling the surface across the circuit into contact with the crossover conductors;

wherein the member is moved by continuing to roll the surface across the circuit to raise an already attached portion of such surface from the circuit while continually attaching other portions of such surface to crossover conductors along the line of contact between the surface and the circuit; and wherein mechanically weak crossover conductors are separated from the circuit by remaining attached to the surface, as the surface is raised from the circuit, at least until after the weak connection breaks.

7. In making electric film circuits having crossover conductors bridging associated crossunder conductors, a method of mechanically strengthening unsupported lengths of the crossover conductors, and of increasing the voltage breakdown strength of such crossover conductors with respect to the corresponding crossunder conductors, which comprises:

positioning one of the circuits for movement relative to a cylinder in a path substantially tangential to the surface of the cylinder;

interposing an adhesive web between the path of the circuit and the cylinder, with an adhesive coating of the web facing toward the path of the circuit;

moving the circuit toward the cylinder and into rolling contact with the interposed adhesive web to attach the unsupported lengths of the crossover conductors on the circuit to the adhesive web as each of the crossover conductors moves into contact with the adhesive web;

separating the adhesive web from the face of the circuit to exert a pull on each of the unsupported lengths of the crossover conductors attached to the adhesive web in the region of separation of the member from the circuit to lift such crossover conductors away from the corresponding crossunder conductors and to increase the voltage breakdown strength between such crossover and crossunder conductors; and forming the crossover conductors arcuately away from the corresponding crossunder conductors as the adhesive member separates from the crossover conductors to increase the mechanical strength of such crossover conductors.

8. A method according to claim 7 wherein the unsupported lengths of the crossover conductors in the circuit extend at right angles to each other and the circuit is moved into rolling contact with the adhesive web in a direction substantially bisecting the angle between the crossover conductors having such lengths extending at right angles to each other.

9. A method according to claim 7 wherein the electric film circuit is a thin film circuit.

10. A method according to claim 9 further including adjusting a space between the adhesive web and the path of the circuit to control the pressure with which the circuit moves into rolling contact with the adhesive coating of the web.

11. A method according to claim 10, wherein the controlled pressure is further equalized by a resilient backup surface on the roller which urges the adhesive coating into contact with the film.

* * * * *